(12) United States Patent
Wichern

(10) Patent No.: US 9,065,487 B2
(45) Date of Patent: Jun. 23, 2015

(54) WIDEBAND SOFTWARE-DEFINED RF RECEIVER

(71) Applicant: NXP B.V., Eindhoven (NL)

(72) Inventor: Andreas Hans Walter Wichern, Hamburg (DE)

(73) Assignee: NXP B.V., Eindhoven (NL)

( * ) Notice: Subject to any disclaimer, the term of this patent is extended or adjusted under 35 U.S.C. 154(b) by 17 days.

(21) Appl. No.: 14/049,390

(22) Filed: Oct. 9, 2013

(65) Prior Publication Data
US 2014/0119482 A1    May 1, 2014

(30) Foreign Application Priority Data
Nov. 1, 2012 (EP) .................................. 12190977

(51) Int. Cl.
*D03D 1/04* (2006.01)
*H04B 1/00* (2006.01)
*H04B 1/10* (2006.01)
(52) U.S. Cl.
CPC .............. *H04B 1/0021* (2013.01); *H04B 1/10* (2013.01); *H04B 1/001* (2013.01)
(58) Field of Classification Search
CPC ....... H04B 1/0021; H04B 1/0003; H04L 5/06
USPC .................. 375/260, 316, 346, 347; 455/132
See application file for complete search history.

(56) References Cited

U.S. PATENT DOCUMENTS

| | | | |
|---|---|---|---|
| 7,116,958 | B1 | 10/2006 | Brown et al. |
| 7,509,670 | B1 * | 3/2009 | Naegeli et al. ................ 725/124 |
| 2003/0054783 | A1 * | 3/2003 | Mason et al. ............... 455/150.1 |
| 2004/0263378 | A1 * | 12/2004 | Jossef et al. ..................... 342/20 |
| 2005/0276351 | A1 | 12/2005 | Puma et al. |
| 2006/0062363 | A1 * | 3/2006 | Albrett ...................... 379/101.01 |
| 2007/0025456 | A1 * | 2/2007 | McCrady ....................... 375/260 |
| 2011/0276157 | A1 * | 11/2011 | Wang et al. ..................... 700/94 |
| 2012/0163517 | A1 * | 6/2012 | Kim et al. ...................... 375/350 |
| 2012/0284464 | A1 * | 11/2012 | Padaki et al. .................. 711/154 |
| 2013/0208838 | A1 * | 8/2013 | Wu et al. ....................... 375/350 |

OTHER PUBLICATIONS

Extended European Search Report for EP Patent Appln. No. 12190977.4 (Mar. 21, 2013).

* cited by examiner

*Primary Examiner* — Daniel Washburn
*Assistant Examiner* — Amneet Singh

(57) ABSTRACT

An RF receiver is disclosed. The RF receiver includes an analog-to-digital converter for converting an analog intermediate frequency band signal to a digital intermediate frequency band signal. A plurality of decimation units coupled in cascade for generating a decimated signal based on the digital intermediate frequency band signal are also included. The RF receiver further includes a signal processing unit for processing the decimated signal and a bypass path for feeding a bypass signal to the signal processing unit. The bypass signal is either the digital intermediate frequency band signal or an output signal from one of the decimation units which is not the last one of the cascade coupled decimation units. The signal processing unit is adapted to detect critical reception conditions based on the bypass signal and to adapt the processing of the decimated signal in accordance with detected critical reception conditions.

15 Claims, 3 Drawing Sheets

PRIOR ART

WIDEBAND SOFTWARE-DEFINED RF RECEIVER

CROSS-REFERENCE TO RELATED APPLICATIONS

This application claims the priority under 35 U.S.C. §119 of European patent application no. 12190977.4, filed on Nov. 1, 2012, the contents of which are incorporated by reference herein.

FIELD OF THE INVENTION

The present invention relates to the field of software-defined RF receivers, in particular to wideband software-defined RF receivers with adaptive reception technology.

ART BACKGROUND

In conventional RF-receivers, analog filter circuitry is used to select the wanted intermediate frequency (IF) band prior to performing analog-to-digital conversion and demodulation. This analog filter circuitry is expensive and in many cases difficult to integrate with the digital circuitry, e.g. in VLSI (very-large-scale integration) CMOS (complementary metal-oxide-semiconductor) designs.

With the increasing availability of low-cost powerful digital signal processors and wideband analog-to-digital converters (ADCs) it has become feasible to omit the expensive and often complex analog filter circuitry and instead sample and process large parts of the reception bands at once. Apart from the cost reduction, new features, such as e.g. simultaneous reception of multiple broadcasts and background search algorithms for alternative radio stations, can be realized with this approach.

However, due to the wide passband of such a receiver, signal content outside a particular wanted frequency band may have a negative influence on the signal content within the wanted frequency band and thereby lead to difficult conditions at the final demodulation stage.

There may thus be a need for an improved wideband RF-receiver which is capable of dealing with the above problems.

SUMMARY OF THE INVENTION

This need may be met by the subject matter according to the independent claims. Advantageous embodiments of the present invention are set forth in the dependent claims.

According to a first aspect there is provided an RF receiver. The described RF receiver comprises (a) an analog-to-digital converter for converting an analog intermediate frequency band signal to a digital intermediate frequency band signal, (b) a plurality of decimation units coupled in cascade for generating a decimated signal based on the digital intermediate frequency band signal, (c) a signal processing unit for processing the decimated signal, and (d) a bypass path for feeding a bypass signal to the signal processing unit, the bypass signal being either the digital intermediate frequency band signal or an output signal from one of the decimation units which is not the last one of the cascade coupled decimation units, wherein the signal processing unit is (e) adapted to detect critical reception conditions based on the bypass signal and (f) to adapt the processing of the decimated signal in accordance with detected critical reception conditions.

This aspect is based on the idea that by analyzing a bypass signal, i.e. the digital intermediate frequency band signal output by the analog-to-digital converter (ADC) or a not fully decimated signal derived from the output of the ADC, critical or potentially disturbing signal content occurring somewhere in the wideband (intermediate frequency band) digital signal which is output by the ADC can be detected and taken into consideration at the processing stage. Thereby, a robust RF receiver can be provided at a relatively low price.

In the present context, the term "analog intermediate frequency band signal" may particularly denote an analog output signal from an RF mixer stage including filtering, the RF mixer stage being designed to provide an intermediate frequency (IF) band signal with a bandwidth corresponding to the bandwidth of interest, i.e. the total bandwidth in which the RF receiver is intended to receive signals. In other words, the bandwidth of the analog intermediate frequency band signal is so large that it encompasses a wide range of frequency bands of interest, i.e. a wide range of narrow frequency bands each of which contains a particular signal of interest, such as e.g. a particular radio station. Accordingly, the analog intermediate frequency band signal does not merely have a bandwidth corresponding to a single signal of interest but rather a bandwidth extending over a wide range of frequencies of interest.

The analog-to-digital converter (ADC) is preferably a wideband sigma-delta ADC capable of converting the analog intermediate frequency band signal into a corresponding digital intermediate frequency band signal, i.e. a digital signal with a bandwidth substantially equal to the bandwidth of the analog intermediate frequency band signal. In other words, the ADC is adapted to sample the analog intermediate frequency band signal with a sample rate which is sufficiently high to substantially maintain the bandwidth of the analog signal.

In the present context, the term "decimation unit" may particularly denote a unit comprising an anti-aliasing filter and a downconverter for reducing the sample rate of a digital signal input to the decimation unit.

In the present context, the term "decimation units coupled in cascade" may particularly denote that the output of a first decimation unit is coupled to the input of a second decimation unit, the output of the second decimation unit is coupled to the input of a third decimation unit, and so forth. In other words, the cascade coupled decimation units reduces the sample rate of the input signal step by step.

In the present context, the term "decimated signal" may particularly denote the output from the last one of the cascade coupled decimation units, i.e. the decimation unit which provides the last step of the decimation. Accordingly, the decimated signal will have a reduced sample rate (and thus also a reduced bandwidth) in comparison to the digital intermediate frequency band signal.

In the present context, the term "signal processing unit" may particularly denote a processing unit comprising a software-defined-radio (SDR) processor and demodulation circuitry.

In the present context, the term "critical reception conditions" may particularly denote signal content within the intermediate frequency band which (due to various effects resulting from the analog and/or digital processing of the signal on its way from the RF input to the signal processing unit) may cause undesirable signal content to occur within the baseband processed by the signal processing unit. Such undesirable signal content in the baseband may cause errors in the final decoded signal or even make it impossible to decode the signal.

By detecting the critical reception conditions based on the bypass signal and adapting the processing of the decimated signal in accordance with the detected critical reception conditions, decoding of the wanted signal becomes possible even for wideband intermediate frequency bands.

The implementation of the bypass path and the signal processing unit incurs significantly less cost than the provision of the high quality analog bandpass filter circuitry used in conventional receivers.

By processing the wideband intermediate frequency signal in the digital domain, it further becomes possible to simultaneously receive and decode several broadcast signals (e.g. radio stations), to perform background search algorithms for alternative stations, etc.

According to an embodiment, the RF receiver further comprises a digital channel filter arranged between the cascade coupled decimation units and the signal processing unit.

In the present context, the term "digital channel filter" may particularly denote a digital filter or digital filter bank which is capable of letting through only signal content within one or more narrow bands (channels, corresponding e.g. to frequency bands where radio stations are supposed to be present).

In other words, the digital channel filter serves to provide only the signal content falling within the channel(s) which is/are of interest to the signal processing unit.

According to a further embodiment, each of the decimation units is adapted to reduce a sample rate by a rational fraction or by an integer factor.

In the present context, the term "rational fraction" may particularly denote a rational number, such as m/n, where both m and n are integers and n>m.

In the case of an integer factor n, the decimation unit picks out every nth sample from the input signal, e.g. every $2^{nd}$ sample in the case where n=2.

It should be noted that in some embodiments, each decimation unit may apply the same rational fraction or integer factor, whereas in other embodiments, at least some of the decimation units may apply different rational fractions or integer factors.

According to a further embodiment, the signal processing unit is adapted to detect critical reception conditions by detecting the presence in the bypass signal of at least one of (a) a spurious interference signal, (b) a DC artifact signal, (c) an image signal, and (d) a harmonic of an unwanted signal.

In the present context, the term "spurious interference signal" may in particular denote an unwanted signal component occurring within the frequency band of interest due to e.g. insufficient electrical isolation In the present context, the term "DC artifact signal" may in particular denote unwanted signal content caused by active circuitry and occurring around a local oscillator frequency in the mixing/tuning stage of the receiver. This unwanted signal content accordingly occurs around the frequency 0 Hz at IF level and may fall into a wanted frequency band, thereby compromising baseband decoding in the signal processing unit.

In the present context, the term "image signal" may in particular denote signal content falling within the desired frequency band as a result of frequency conversion or decimation.

In the present context, the term "harmonic of an unwanted signal" may in particular denote unwanted signal content within the desired frequency band, which is a harmonic (i.e. $2^{nd}, 3^{rd}, \ldots n^{th}$ harmonic) of a strong unwanted signal located outside the desired frequency band.

According to a further embodiment, the signal processing unit is adapted to detect the critical reception conditions by analyzing a FFT (i.e. a fast-Fourier transform) of the bypass signal.

By analyzing the content of the bypass within each FFT-bin, the signal processing unit may determine whether one of the above mentioned types of unwanted signals (or other unwanted signals) may cause problems within the desired frequency band.

According to a further embodiment, the FFT has a resolution in the range of 50 kHz to 500 kHz, such as in the range of 100 kHz to 400 kHz, such as in the range of 200 kHz to 300 kHz, such as around 250 kHz.

Such a coarse FFT analysis can easily be performed by the signal processing unit in parallel with the main processing of the signal without noticeable impact for the user.

According to a further embodiment, the signal processing unit is adapted to adjust tuning such that a wanted signal or an interfering signal is displaced within the intermediate frequency band.

This may e.g. be achieved by outputting a control signal to a local oscillator such that the latter changes its frequency.

According to a further embodiment, the signal processing unit is adapted to remove an interfering signal by applying a notch filter.

This may be performed by the signal processing unit.

According to a further embodiment, the intermediate frequency band has a bandwidth of at least 10 MHz, such as 20 MHz, such as 30 MHz, such as 40 MHz, such as 50 MHz, such as 60 MHz, such as 70 MHz, such as 80 MHz, such as 90 MHz, or such as 100 MHz.

It should be noted that in embodiments for use in DAB (Digital Audio Broadcast) receivers, the intermediate frequency band may preferably have a bandwidth of 40 MHz.

According to a second aspect, there is provided a DAB (Digital Audio Broadcasting) radio apparatus comprising an RF receiver according to the first aspect or any of the above embodiments.

The DAB radio apparatus according to the second aspect benefits from the advantages described above with regard to the first aspect and the related embodiments. In particular, the DAB radio apparatus is among others capable of simultaneously receiving and decoding several broadcast signals (e.g. radio stations) and of performing background search algorithms for alternative stations without the necessity of expensive analog filtering circuitry.

According to a third aspect, there is provided a method of receiving RF signals. The described method comprises (a) converting an analog intermediate frequency band signal to a digital intermediate frequency band signal, (b) generating a decimated signal based on the digital intermediate frequency band signal using a plurality of decimation units coupled in cascade, (c) processing the decimated signal at a signal processing unit, (d) feeding a bypass signal to the signal processing unit via a bypass path, the bypass signal being either the digital intermediate frequency band signal or an output signal from one of the decimation units which is not the last one of the cascade coupled decimation units, and, at the signal processing unit, (e) detecting critical reception conditions based on the bypass signal and (f) adapting the processing of the decimated signal in accordance with detected critical reception conditions.

Like the first aspect described above, this third aspect may be based on the idea that by analyzing a bypass signal, i.e. the digital intermediate frequency band signal output by the analog-to-digital converter (ADC) or a not fully decimated signal derived from the output of the ADC, critical or potentially disturbing signal content occurring somewhere in the wideband (intermediate frequency band) digital signal which is output by the ADC can be detected and taken into consideration at the processing stage. Thereby, robust RF signal reception can be provided at a relatively low price.

The method may preferably be implemented in a device according to the first aspect and any of the embodiments thereof as described above.

According to a fourth aspect, there is provided a computer program comprising computer executable instructions which when executed by a computer causes the computer to perform the steps of the method according to the third aspect.

The computer may preferably be or comprise a software-defined radio processor.

According to a fifth aspect, there is provided a computer program product comprising a computer readable data carrier loaded with a computer program according to the fourth aspect.

It is noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular a combination of features of the method type claims and features of the apparatus type claims, is part of the disclosure of this document.

The aspects defined above and further aspects of the present invention are apparent from the examples of embodiment to be described hereinafter and are explained with reference to the examples of embodiment. The invention will be described in more detail hereinafter with reference to examples of embodiment to which the invention is, however, not limited.

DETAILED DESCRIPTION

Figure 1:
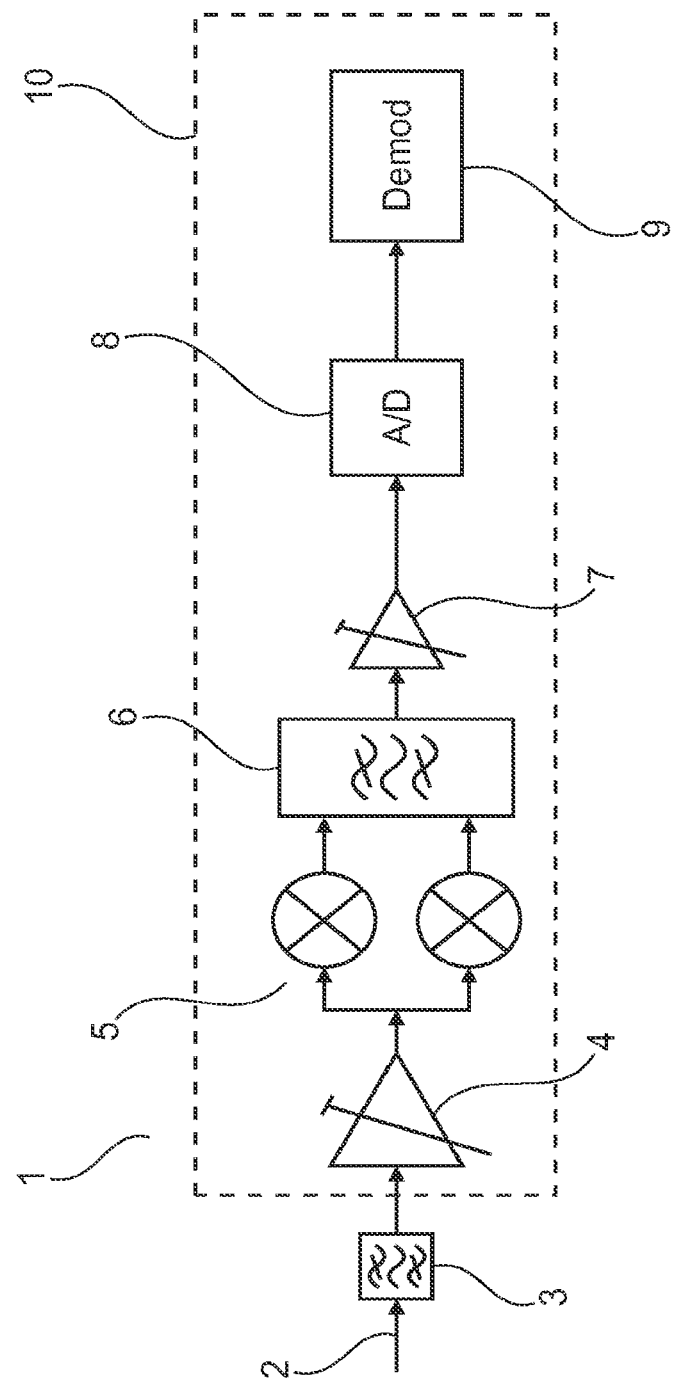
FIG. 1 shows a block diagram of a conventional RF receiver.

The illustration in the drawing is schematic. It is noted that in different figures, similar or identical elements are provided with the same reference signs or with reference signs, which differ only within the first digit.

FIG. 1 shows a block diagram of a conventional RF receiver 1. The receiver 1 comprises an RF filter 3 which receives an RF input signal 2 from an antenna (not shown). The RF filter 3 is a band-pass filter designed to let signal content within a certain frequency range pass through it. The filtered signal is amplified by low noise amplifier 4 and forwarded to an RF I/Q-mixer 5 which generates in-phase (I) and quadrature-phase (Q) signals and forwards these through IF filter 6. The IF filter 6 is an analog pass-band filter with a relatively narrow pass-band surrounding the frequency range where a desired signal content is located. The filtered IF-signal is amplified by IF amplifier 7 and converted to a digital signal by ADC 8. The ADC 8 has a sample rate at least fulfilling the Nyquist criteria such that the full bandwidth of the filtered analog IF-signal is maintained in the converted digital signal. Finally, the digital signal is demodulated by hardware demodulator 9 in order to obtain the desired signal content.

The stipulated line 10 surrounds the elements which are formed as an integrated circuit. More specifically, the integrated circuit 10 comprises the low noise amplifier 4, the I/Q mixer 5, the IF filter 6, the IF amplifier 7, the ADC 8 and the demodulator 9.

Accordingly, a conventional RF receiver 1 as the one shown in FIG. 1 performs a significant part of the processing in the analog domain while only the wanted narrowband signal is processed in the digital domain. This analog processing, in particular filtering, is associated with high cost and effort and is difficult to implement in certain technologies, such as e.g. VLSI CMOS. Furthermore, simultaneous reception of several channels or parallel searching for alternative stations requires additional analog filtering circuitry and thus increases the costs even further.

Figure 2:
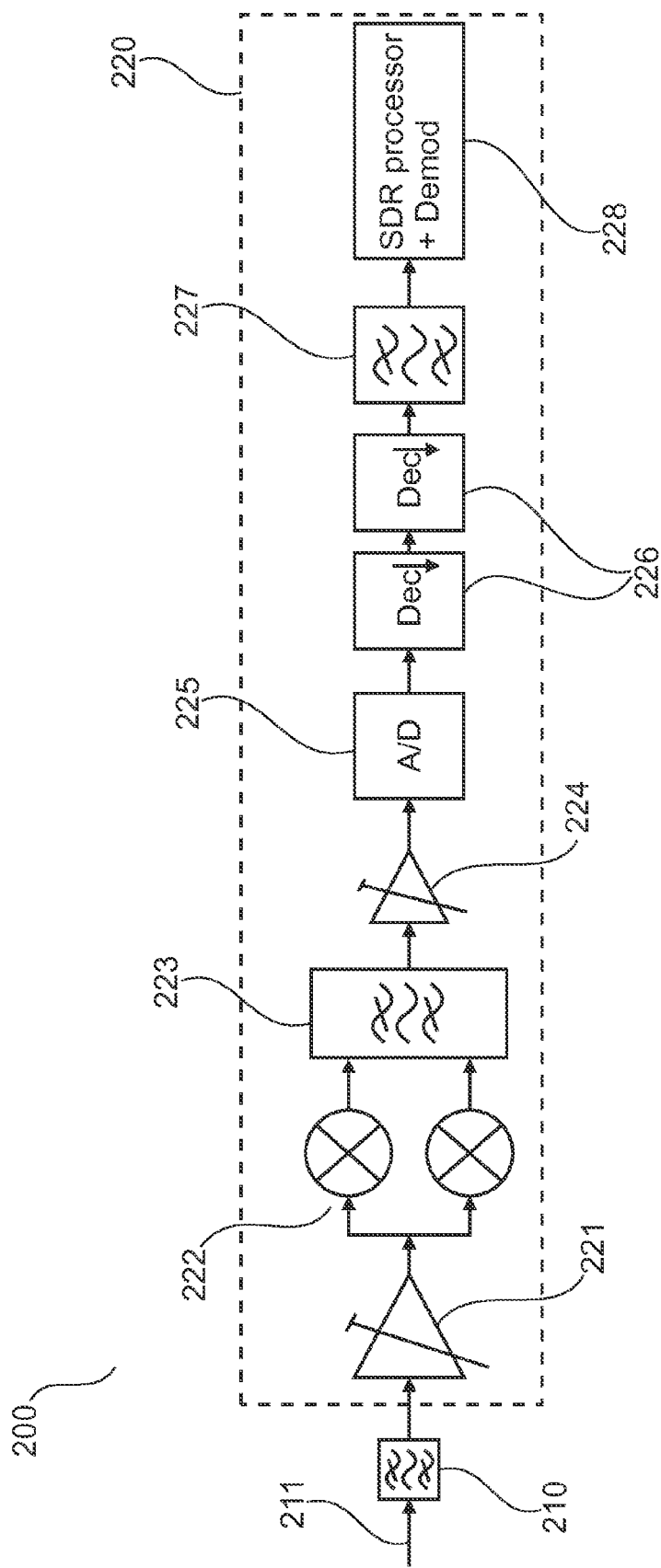
FIG. 2 shows a block diagram of a general software-defined RF receiver.

FIG. 2 shows a block diagram of a general software-defined RF receiver 200, i.e. a receiver where the majority of the processing takes place in the digital domain by means of a programmable signal processing unit 228. More specifically, like the conventional RF receiver shown in FIG. 1 and described above, the software-defined RF receiver 200 comprises an RF input filter 210 and an integrated circuit 220 comprising the remaining receiver components. In comparison to the RF filter 3 of the conventional receiver 1 shown in FIG. 1, the RF filter 210 is a less costly coarse RF filter with a wider passband.

The integrated circuit 220 comprises the remaining receiver components, i.e. low noise amplifier 221, RF I/Q mixer 222, coarse IF filter 223, IF amplifier 224, wideband sigma-delta ADC 225, decimation units 226, digital channel filter 227, and a signal processing unit 228. The signal processing unit 228 comprises a software-defined radio processor and demodulation circuitry.

In operation, the RF filter 210 receives an RF input signal 211 from e.g. an antenna (not shown) and forwards the pass-band filtered RF signal to an input of the integrated circuit 220, where it is amplified by the low noise amplifier 221 and then mixed to an intermediate frequency (IF) band by I/Q mixer 222 and IF filter 223 and finally amplified by IF amplifier 224. In comparison to the conventional receiver 1 shown in FIG. 1, the resulting analog intermediate frequency band signal has a significantly larger bandwidth. If the receiver 200 is to be used in a DAB radio apparatus the IF bandwidth may e.g. be around 40 MHz. The hitherto described analog part of the receiver 200 differs from the corresponding part of the conventional receiver 1 shown in FIG. 1 mainly in the RF filter 210 and in particular the IF filter 223 have much larger bandwidths than the corresponding RF-filter 3 and IF filter 6 of the conventional RF receiver 1 shown in FIG. 1 (i.e. they are coarse filters in comparison). This fact already reduces the cost of the analog components of the receiver 200 significantly.

The sigma-delta ADC 225 converts the wideband analog intermediate frequency band signal output by the IF amplifier 224 to a corresponding wideband digital intermediate frequency band signal. This digital signal is then run through a cascade of decimation units 226 which step by step reduces the sample rate (and thereby the bandwidth) of the digital signal. FIG. 2 shows two decimation units 326. However, it is explicitly noted that more (i.e. 3, 4, 5, 6 or even more) decimation units 326 may be provided. After the decimation stage, a desired narrow frequency band (channel) is selected by digital channel filter 227 and forwarded to the signal processing unit 228 where the desired signal content is extracted (decoded) by the software-defined radio processor and demodulator circuitry.

However, due to the large bandwidth of the intermediate frequency band signal, the narrow-band signal processed by the signal processing unit 228 may in addition to the wanted signal content also contain unwanted signal content originating from various hardware effects. Such unwanted signal content may severely degrade the receiver performance or even make decoding of the wanted signal content impossible. Examples of unwanted signal content include (but is not limited to) spurious signals interfering with the wanted signal content, DC artifact signals, image signals, and harmonics of other signals. As the signal processing unit 227 only receives the wanted narrow frequency band after decimation and channel filtering of the intermediate frequency band signal, the processing unit 228 is unable to distinguish wanted and unwanted signal content from each other.

Figure 3:
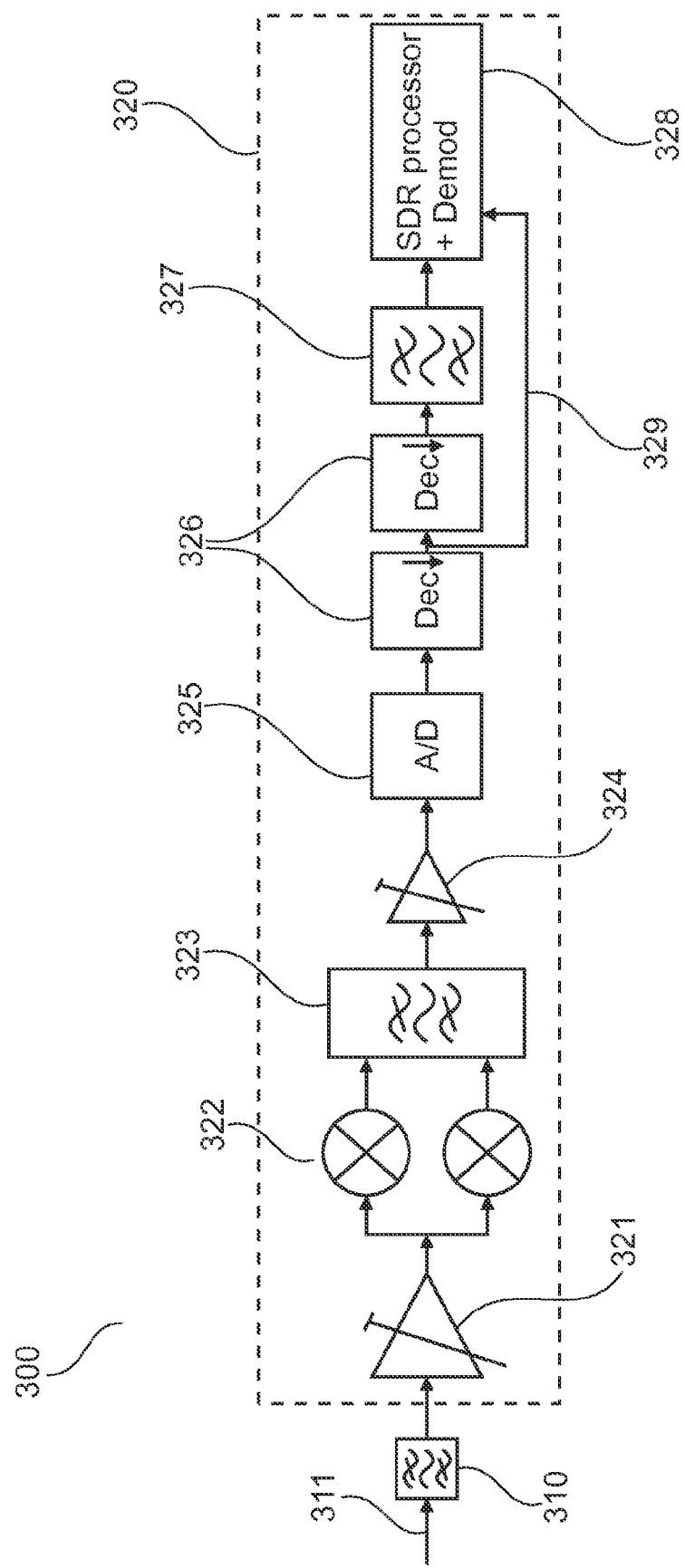
FIG. 3 shows a block diagram of a software-defined RF receiver in accordance with an embodiment.

FIG. 3 shows a block diagram of an improved software-defined RF receiver 300 in accordance with an embodiment of the present invention. The improved receiver 300 is capable of overcoming the abovementioned drawbacks of the receiver 200 shown in FIG. 2, i.e. in particular the negative impact of unwanted signal content originating from the wide intermediate frequency band.

The structure and elements of the receiver 300 correspond in so far as nothing else is explicitly stated in the following to the structure and elements of the receiver 200 shown in FIG. 2 and described in detail above. For reasons of brevity, the description of the corresponding structure and elements will not be repeated.

The receiver 300 differs from the receiver 200 in two points. The first point is the bypass path 329 between the output of the first decimation unit 326 of the cascade coupled decimation units 326 and the signal processing unit 328. The second point is that the signal processing unit 328 is adapted to process and analyze the bypass signal provided via the bypass path 329. It should be noted that the specific arrangement of the bypass path 329 shown in FIG. 3 is exemplary. The purpose of the bypass path 329 is to bypass at least a part (or even all) of the cascaded decimation units 326 as well as the channel filter 327 and thereby provide (almost) the entire IF band signal to the signal processing unit. Thereby, the signal processing unit 328 will be able to identify potentially critical signal content within the IF band which may have a negative impact on the reception quality.

The identification of potentially critical signal content is performed by applying a FFT to the bypass signal. The FFT can be applied without interrupting the RF signal, i.e. in parallel with the reception processing, and if necessary, the FFT can be applied while the RF input 311 is momentarily shut off. In the latter case, the duration of the momentary shut off of the RF input is about $1/\Delta f$, where $\Delta f$ denotes the frequency resolution of the FFT. The duration of the momentary shut off of the RF signal 311 is so short that it does not have any noticeable impact on the receiver performance. In this embodiment, the FFT has a resolution of 250 kHz, corresponding to a duration of about 4 μs of the momentary shut off of the RF signal 311. By analyzing the result of the FFT, spurious signals and DC artifacts which will interfere with or mask the wanted signal content can be detected. Similarly, signal content in frequency bands which causes disturbing image signals or harmonics within the frequency band of the wanted signal can be detected. It should be noted, that e.g. spurious signals and DC artifacts can in many cases best be detected by shortly interrupting the RF signal 311, whereas e.g. unwanted image signals and harmonics are best detected without shutting off the RF signal 311 while applying the FFT to the bypass signal.

If the analysis of the FFT of the bypass signal reveals that one or more of the above (or other) unwanted signal sources are present, the signal processing unit 328 can react accordingly. For example, in the case of a spurious signal interfering with the wanted signal, the signal processing unit 328 will send a control signal to the I/Q mixer 322 and/or the IF filter 323 to adjust tuning (i.e. the frequency of a local oscillator) such that the interfering signal is shifted (displaced) to a position outside the wanted frequency band. Similar strategies are applicable in case of DC artifacts, image signals and harmonic signals. As an alternative or addition to the aforementioned tuning adjustment, a notch filter can be used to remove the interfering signal component in the baseband processing performed by the signal processing unit 328. This approach is particularly useful when the interfering signal is not fixed within the IF band but moves along with the wanted signal. Although the application of a notch filter may also remove a part of the wanted signal, the use of error correction algorithms in the coding/decoding of the wanted signal will in many cases assure that the remaining signal is useable in the sense that the contents of the signal can be successfully obtained. This is in particular the case with the orthogonal frequency-division multiplexing (OFDM) signals used in DAB broadcasting signals.

It is noted that, unless otherwise indicated, the use of terms such as "upper", "lower", "left", and "right" refers solely to the orientation of the corresponding drawing.

It should be noted that the term "comprising" does not exclude other elements or steps and that the use of the articles "a" or "an" does not exclude a plurality. Also elements described in association with different embodiments may be combined. It should also be noted that reference signs in the claims should not be construed as limiting the scope of the claims.

The invention claimed is:
1. An RF receiver comprising
an analog-to-digital converter for converting an analog intermediate frequency band signal to a digital intermediate frequency band signal, wherein the analog intermediate frequency band signal has a plurality of narrow frequency bands of interest each of which contains a particular signal of interest,
a plurality of decimation units coupled in cascade for generating a decimated signal, corresponding to the particular signal of interest in one of the plurality of narrow frequency bands, based on the digital intermediate frequency band signal,
a signal processing unit for processing the decimated signal, and
a bypass path for feeding a bypass signal to the signal processing unit, the bypass signal being either the digital intermediate frequency band signal or an output signal from one of the decimation units which is not the last one of the cascade coupled decimation units,
wherein the signal processing unit is adapted to, by processing the bypass signal in parallel with the decimated signal of the last one of the cascade coupled decimation units, detect critical reception conditions in the particular signal of interest in one of the plurality of narrow frequency bands caused by information indicated by the bypass signal from at least one other of the plurality of narrow frequency bands of interest based on the bypass signal and to adapt the processing of the decimated signal in accordance with detected critical reception conditions.

2. The RF receiver according to claim 1, further comprising a digital channel filter arranged between the cascade coupled decimation units and the signal processing unit, wherein the bypass path is configured and arranged to provide the bypass signal at a higher sampling rate, relative to the decimated signal, and the signal processing unit is configured and arranged to detect the reception conditions via the bypass signal and related higher sampling rate to adapt processing of the decimated signal, the decimated signal being of a lower sampling rate relative to the bypass signal.

3. The RF receiver according to claim 1, wherein each of the decimation units is adapted to reduce a sample rate by a rational fraction or by an integer factor.

4. The RF receiver according to claim 1, wherein the signal processing unit is adapted to detect critical reception conditions by detecting the presence in the bypass signal of at least one of a spurious interference signal, a DC artifact signal, an image signal, and a harmonic of an unwanted signal.

5. The RF receiver according to claim 1, wherein the signal processing unit is adapted to detect the critical reception conditions by analyzing a FFT (fast Fourier transform) of the bypass signal.

6. The RF receiver according to claim 5, wherein the FFT has a resolution in the range of 50 kHz to 500 kHz.

7. The RF receiver according to claim 1, wherein the signal processing unit is configured and arranged to adapt the processing of the decimated signal by adjusting tuning, based on the bypass signal, such that a wanted signal or an interfering signal is displaced within the intermediate frequency band.

8. The RF receiver according to claim 1, wherein the signal processing unit is adapted to remove an interfering signal by applying a notch filter.

9. The RF receiver according to claim 1, wherein the intermediate frequency band has a bandwidth of at least 10 MHz.

10. A DAB (Digital Audio Broadcast) radio apparatus comprising an RF receiver according to claim 1.

11. The RF receiver of claim 1, wherein
the bypass path is configured and arranged to provide the bypass signal with a high sample rate that is sufficiently high to maintain the bandwidth of the analog intermediate frequency band signal, and
the signal processing unit is configured and arranged to process the decimated signal by processing the decimated signal at a sampling rate that provides a lower sampling rate reduced by an integer factor of at least two and lower bandwidth, relative to the sample rate and bandwidth of the bypass signal, based upon signal content identified in the bypass signal.

12. A method of receiving RF signals, the method comprising
converting an analog intermediate frequency band signal to a digital intermediate frequency band signal,
generating a decimated signal based on the digital intermediate frequency band signal using a plurality of decimation units coupled in cascade, the decimated signal being output by a last one of the plurality of decimation units,
providing the decimated signal to a signal processing unit via a decimated signal path and processing the decimated signal at the signal processing unit,
feeding a bypass signal to the signal processing unit via a bypass signal path that is different than the decimated signal path, the bypass signal being either the digital intermediate frequency band signal or an output signal from one of the decimation units which is not the last one of the cascade coupled decimation units, and
at the signal processing unit detecting critical reception conditions based on the bypass signal and adapting the processing of the decimated signal in accordance with detected critical reception conditions.

13. A computer program comprising computer executable instructions stored on a non-transitory computer readable medium, which when executed perform the steps of the method according to claim 12.

14. A signal processing circuit having a software-defined-radio processor circuit and a non-transitory computer readable data carrier loaded with instructions including the computer program according to claim 13, the signal processing circuit being configured and arranged to execute the instructions.

15. The method of claim 12, wherein
generating the decimated signal includes providing the decimated signal at a reduced sampling rate reduced by an integer factor of at least two and reduced bandwidth, relative to the sampling rate and bandwidth of the digital intermediate frequency band signal;
feeding the bypass signal includes providing the digital intermediate frequency band signal with a high sample rate that is sufficiently high to maintain the bandwidth of the analog intermediate frequency band signal; and
adapting the processing of the decimated signal includes processing the decimated signal at the reduced sampling rate based on reception conditions detected in the bypass signal at the high sample rate.

* * * * *